Feb. 25, 1969     C. F. REICHERT     3,429,209

DUPLICATING DEVICE FOR A LATHE

Filed March 1, 1967     Sheet 1 of 2

INVENTOR.
CHARLES F. REICHERT
BY Walter J. Kreske
ATTORNEY

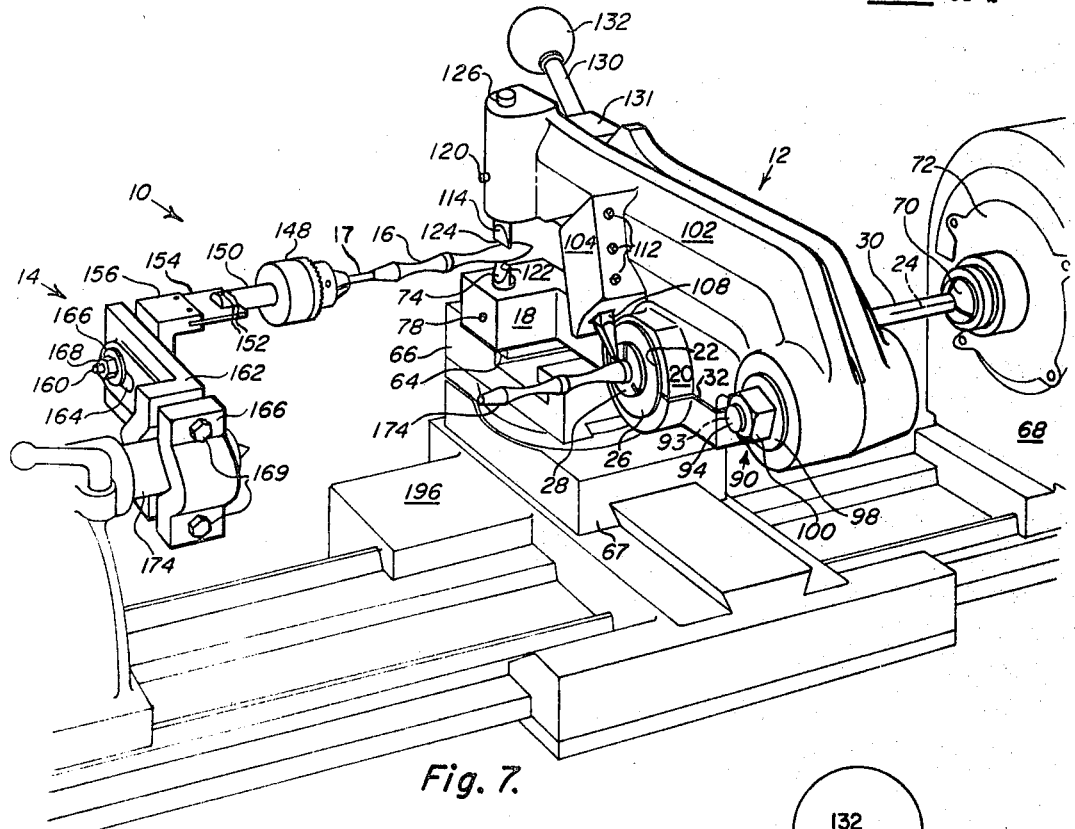
Fig. 7.
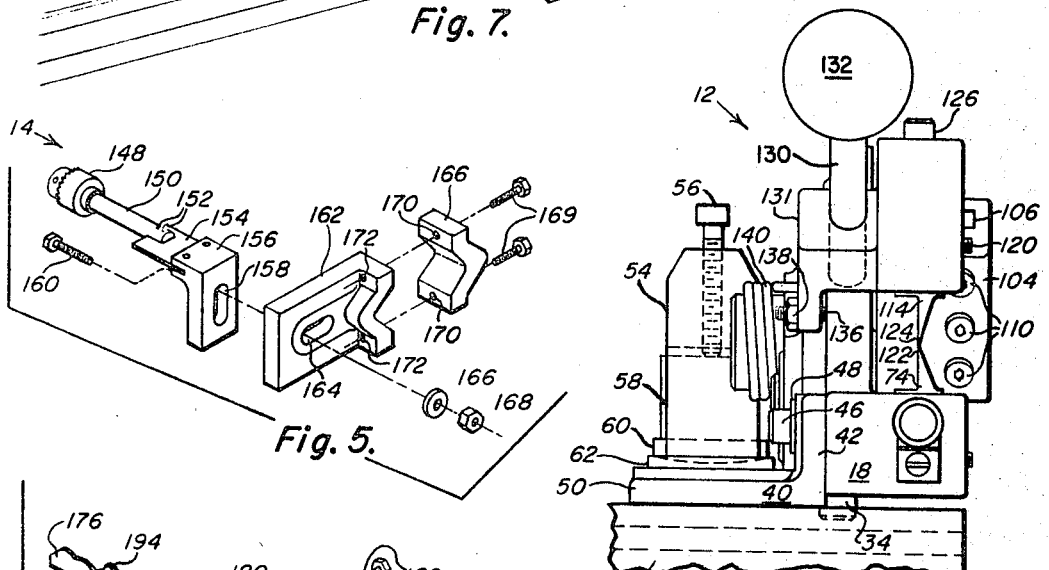
Fig. 5.
Fig. 3.
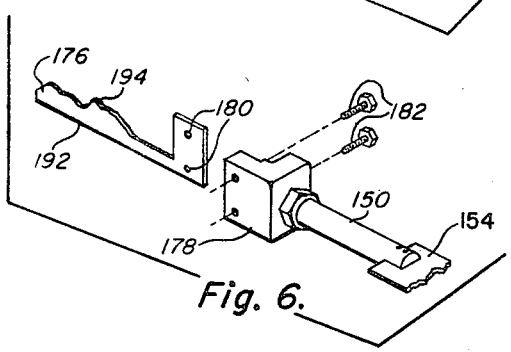
Fig. 6.
INVENTOR.
CHARLES F. REICHERT
BY Walter J. Kreske
ATTORNEY

United States Patent Office 3,429,209
Patented Feb. 25, 1969

3,429,209
DUPLICATING DEVICE FOR A LATHE
Charles F. Reichert, 63 Valley Road,
Norwood, Mass. 02062
Filed Mar. 1, 1967, Ser. No. 619,784
U.S. Cl. 82—14                           12 Claims
Int. Cl. B23b *3/38;* B23c *9/00*

ABSTRACT OF THE DISCLOSURE

Attachments for the tailstock and cross slide of a lathe; including a template holder for fastening to the tailstock, a combined template follower, cutting tool holder and work support adapted for fastening to the cross slide and cooperating with a template in the template holder to reproduce the template contour on a work-piece rotated in the headstock of the lathe and supported at the cutting tool by the work support to thereby make possible repetitive production of copies of a sample which is used as the template in the template holder.

---

Heretofore it has been generally necessary to make special templates for use with conventional lathe attachments for product duplication machining in a lathe. Such cumbersome, time consuming and costly special template requirement is particularly undesirable in short production runs where only a relatively few machined copies of a sample product are desired. And in the instance where a hydraulic lathe tracing attachment has been used to permit reproduction from a sample piece, the device required the sample piece to be positioned with its axis exactly parallel with the axis of the headstock of the lathe. Any relative motion between the axis of the sample and the axis of the lathe, such as might be caused by vibration, pressure of the follower stylus, sag of the sample, and the like resulted in direct error in duplication. Thus, a long slender sample couldn't be used due to its natural propensity to sag or bend, nor could it be used if it were initially bent or distorted.

These problems have been overcome by the present invention which not only may operate from an actual sample and with an accuracy on product duplication substantially unaffected by slight bends or sagging of the sample, but also includes other desirable features and advantages. Among these other desirable features and advantages achieved by the present invention is the provision of a product duplicating lathe attachment which utilizes a small portion of the cutting tool forces to assist in urging and maintaining the template follower against the surface being duplicated and the cutting forces on the cutting tool being directed for maximum rigidity between the work-piece and the cutting tool. Other desirable features and advantages include a product duplicating lathe attachment which is relatively inexpensive in construction, easy to set in operating position on a lathe, as well as easy to operate and control for fine repetitive accuracy in production.

A primary object of the present invention is the provision of a product duplicating lathe attachment having capacity for utilizing as the template a sample product to be duplicated.

Another object is the provision of a product duplicating lathe attachment having capacity for selectively operating with either a conventional flat template or the sample product which is to be duplicated.

And a still further object is the provision of a product duplicating lathe attachment which is inherently adjustable for roughing and finish cuts during the duplicating operation.

And another object is the provision of a product duplicating lathe attachment which provides support to the work-piece during the cutting operation.

Further objects include the provision of a product duplicating attachment which utilizes a portion of the cutting tool forces for maintaining the template follower in position, the major portion of the tool forces being directed for maximum rigidity between work-piece and cutting tool, an attachment which may be relatively easily and rapidly set up for operation in a lathe and removed from the lathe for conventional lathe operation, is relatively easy to operate, and is rugged, accurate and reliable in operation.

These objects, features and advantages are achieved generally by providing a base adapted for attachment to the cross slide of the lathe and having a work support structure, a template follower reference element on one side of the work support structure, a lever mounted to pivot on the other side of the work support structure, the lever having a tool holder for holding a cutting tool at the work support structure, and a template follower in cooperative relation to the template follower reference element.

By providing the base with an adapter for fastening to the cross slide by means of the conventional lathe tool post assembly, a very simple, reliable, rapid and economical attaching and detaching arrangement is thereby achieved.

By making the template follower reference element adjustable manually between two fixed positions, a rapid and accurate adjustment for a finish cut on the work-piece is thereby achieved.

By making the template follower adjustable, initial positioning of the cutting tool during set-up of the attachment, as well as compensation for inherent geometric correction between cutting tool travel and template follower travel is thereby achieved.

By providing a spring at the pivotal mounting for yieldably urging the lever against the work-piece, improvement in accuracy of the cutting operation is thereby achieved.

By providing an adjustable stop arrangement between the lever and the base suitable control and selectivity of depth of roughing cuts is thereby achieved.

These and other features, objects and advantages will be better understood from the following description taken in connection with the accompanying drawing wherein:

FIG. 3 is a front view of the FIG. 1 embodiment taken on line 3—3 of FIG. 2;

FIG. 5 is an isometric view of the components in a suitable template holder for use with the embodiment illustrated in FIGS. 1, 2 and 3 in accordance with the present invention;

FIG. 6 is an isometric view of a modified version of the FIG. 5 template holder for use with the FIG. 4 embodiment;

FIG. 7 is an isometric view of the FIGS. 1 and 5 structures attached in operative position in a lathe.

Figure 1:
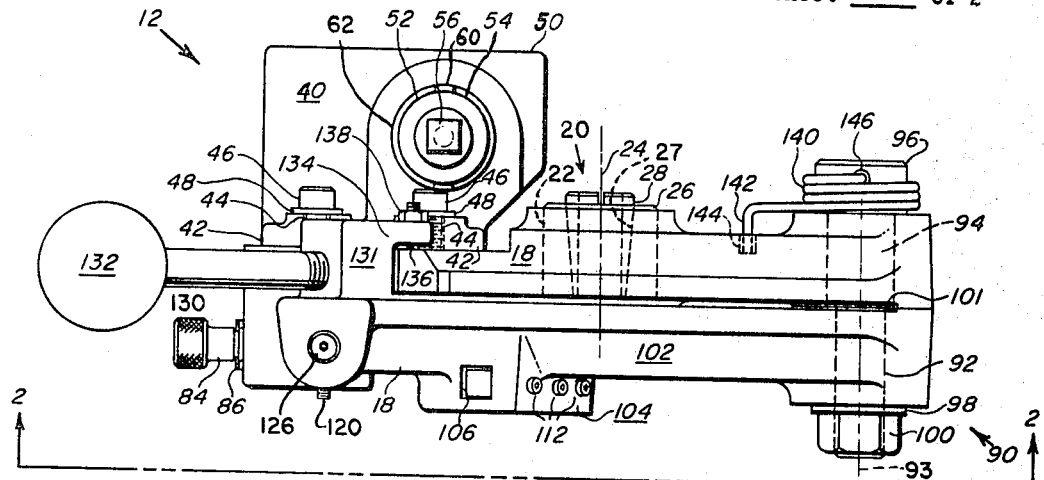
FIG. 1 is a plan view of a preferred embodiment of a lathe attachment in accordance with the present invention.

Referring to the drawings in more detail, a duplicating device for lathes in accordance with the present invention is designated generally by the numeral 10 in FIG. 7 and includes a combined template follower and cutting tool holder 12 and template holder 14 for holding a template 16 in suitable position for guiding the combined template follower and cutting tool holder 12 as will hereinafter be further described. The combined template follower and cutting tool holder 12 has a base 18 carrying substantially centrally thereof a work support structure 20 which includes a circular hole 22 therethrough having an axis 24 providing a common axis for a sleeve 26 and bushing 28 support for a work-piece 30 such as drill-rod or other suitable material from which duplicate products are to be cut in accordance with the present invention. The sleeve 26 is rigidly held in place by tightening a screw 34 to deflect a slot 32 in the base 18 and communicating with the hole 22.

The sleeve 26 preferably has a taper 27 (FIG. 1) along its inside diameter with a matching taper along the outside diameter of the bushing 28 which also carries longitudinal slots 36 partially through the wall of the bushing 28 and a third slot 38 completely through the wall of the bushing to provide suitable flexibility. Thus, by pushing the bushing 28 axially of the sleeve 26, the matching tapers thereof provide suitable variation in diameter of the bushing 28 to effect a sliding fit and thereby suitable support to the rod or work-piece 30.

To one side of the work support structure 20 is an angle bracket 40 having an upright leg 42 carrying slots 44 permitting adjustable clamping to the base 18 by means of screws 46 and washers 48. The angle bracket 40 also has a horizontal leg 50 carrying a hole 52 (FIG. 1) for receiving a standard lathe tool post 54 and carrying a tool post screw 56 (FIGS. 1 and 3) which may be tightened against a tool holder shank or any metal block 58 in the tool holder slot of the tool post 54 against a rocker arm 60 and adapter washer 62 on the horizontal leg 50 to thereby with the tool post T-slot adapter 63 and T-slot 64 of a conventional compound rest 66 of a lathe 68 clamp the bracket 40 rigidly in place on the cross slide 67.

Adjustment by means of the slots 44 before tightening clamping screws 46 in place, permits alignment of the bushing 28 axis 24 with the axis of the work-piece 30 whose other end may be held in a collet 70 which in turn is in a headstock 72 of the lathe 68 and having the same axis of rotation as axis 24.

In the base 18, adjacent the angle bracket 40, is an upright template reference follower 74 which may have a cylindrical body portion 76 carrying a vertical slot or keyway 78 in the bottom portion thereof for receiving a guide pin 78 held in place in the base 18. The body portion 76 also has a horizontally disposed slot 80 receiving an eccentric end 82 of a rotatable adjusting pin 84 held in position by a bifurcated spring clip 86 fixed to the base 18 by a screw 88. By rotating the knurled head of the adjusting pin 84, the eccentric end 82 in adjusting slot 80 causes the upright template reference follower 74 to move selectively upwardly and downwardly by the amount of the eccentricity built into the eccentric end 82 for thereby providing easy adjustment capability for a finish cut on the work-piece 30 as will be hereinafter further described.

On the other side of the work support structure 20 of the base 18 is a pivotal mounting arrangement 90 in the form of a hole 92 having an axis 93 parallel to axis 24 and carrying a pivotal screw 94 for pivotally mounting a combined cutting tool holding and template following lever 102. The pivotal screw 94 has a spring carrying head 96 on the outside of the base 18 and is fastened by a washer 98 and nut 100 and shoulder 101 to the pivotal end of the combined cutting tool holding and template following lever 102. A cutting tool holder 104 is carried substantially centrally of the lever 102. The tool holder 104 is angularly disposed with respect to the lever 102 and has a tool receiving opening 106 carrying a similarly angularly disposed cutting tool 108 therein. Adjustable set screws 110 permit adjustment of the cutting tool 108 to position the tip of the cutting tool 108 to exactly the axis 24 in the initial setting as will hereinafter be further described. Set screws 112 are used to rigidly fasten the cutting tool 108 in place in the above mentioned angular position against the adjusting set screws 110 forming a small angle 109 (FIG. 2) with a line 111 perpendicular to an imaginary line (not shown) between the work-piece and pivot axes 24 and 93 respectively to thereby make substantially all cutting forces on the cutting tool 108 to pass through the pivot axis 93. Only a small angular component of these forces, represented by angle 109, tends to urge the lever 102 downwardly toward the base 18. Thus, substantially all of the cutting forces are internal to the rugged base 18 and lever 102 for effecting maximum rigidity between the work-piece 30 and cutting tool 108.

The combined tool holder and template follower lever 102 carries slidably therein a downwardly depending template follower element 114 which may have a cylindrical body portion 116 slidable in the end of and in perpendicular relation to the lever 102. The cylindrical body portion 116 carries a slot or keyway 118 with a set screw guide pin 120 in the slot 118 and threadably anchored in the lever 102 for prevening rotation of the body portion 116 and thereby maintaining the horizontally disposed follower surface 124 aligned with the template contour follower surface 122 of the template reference follower 74.

The upper end of the body portion 116 has a threaded hole therein receiving the threaded stem of an adjusting screw 126 permitting upward and downward adjustment of the movable template follower 114 against yieldable pressure of a spring 128 at the end of the body portion 116. After suitable adjustment, the set screw 120 may be tightened against the slot 118 to fix the template follower 116 in place in the lever 102.

A control rod 130 has a threaded end screwed through a projection or lug 131 so as to provide an engaging stop against the base 18 to prevent pivotal movement of the lever 102 and thereby provide an adjustable fastening arrangement for limiting depth of roughing cuts by the cutting tool 108 as will be hereinafter further described. The other end of the control rod 130 carries a spherical knob 132 for convenience in manual movement both as to rotation to vary the stop position for depth of cut by the cutting tool 108 and to move the lever 102 about the pivot axis 93.

A flange 134 on the projection 131 and carrying an adjustable support screw 136 locked in place by a nut 138 provides a support structure for engaging the side surface of the base 18 to assist in minimizing side play in lever 102 from thrust at the cutting tool 108 during the cutting operation.

A spring 140 with one end 142 engaging a hole 144 in the base 18 and the other end engaging a hole 146 in the spring carrying head 96 provides a yieldable urging of the lever 102 and template contour following surface 124 toward the template contour following surface 122. Such yieldable force from the spring 140 may be selectively increased or decreased by rotational adjustment of the spring carrying head 96 while the nut 100 is loosened and then tightening the nut 100 to anchor the head 96 in the selected adjustment position.

Referring to FIG. 5, the template holder 14 is comprised of a conventional Jacobs drill chuck 148 or equivalent mounted on one end of a rod 150, the other end of which is fastened by pins 152 to one end of a flat spring 154 with its other end fixed to a horizontal leg 156 of an angle iron, the other leg of which carries a slot 158 for receiving a screw 160. The screw 160 and slot 158 permits adjustable clamping for vertical adjustment to a bracket 162 carrying a horizontal slot 164 for receiving the screw 160 for horizontal adjustment and fastening in place by a washer 166 and nut 168. The bracket 162 has a yoke 166 which in combination with screws 169 through holes 170 in the yoke 166 and threaded holes 172 in bracket 162 form a clamp which permits clamping to a tailstock spindle 174 of the lathe 68 as shown in FIG. 7.

Referring to FIG. 7 in more detail, in the operation of the present invention, the combined template follower and cutting tool holder 12 is fastened by means of the tool post 54 to the compound rest 66 of the cross slide 67 as described in connection with FIG. 3 above. Adjusting screws 46 (FIGS. 1 and 3) are used to provide vertical adjustment for achieving with swing about the tool post 54 an alignment of axis 24 with the axis of the headstock 72, before fastening firmly in place. The bushing 28 is adjusted by means of the bushing taper 27 described above to provide a suitable sliding fit about the work-piece 30.

Figure 2:
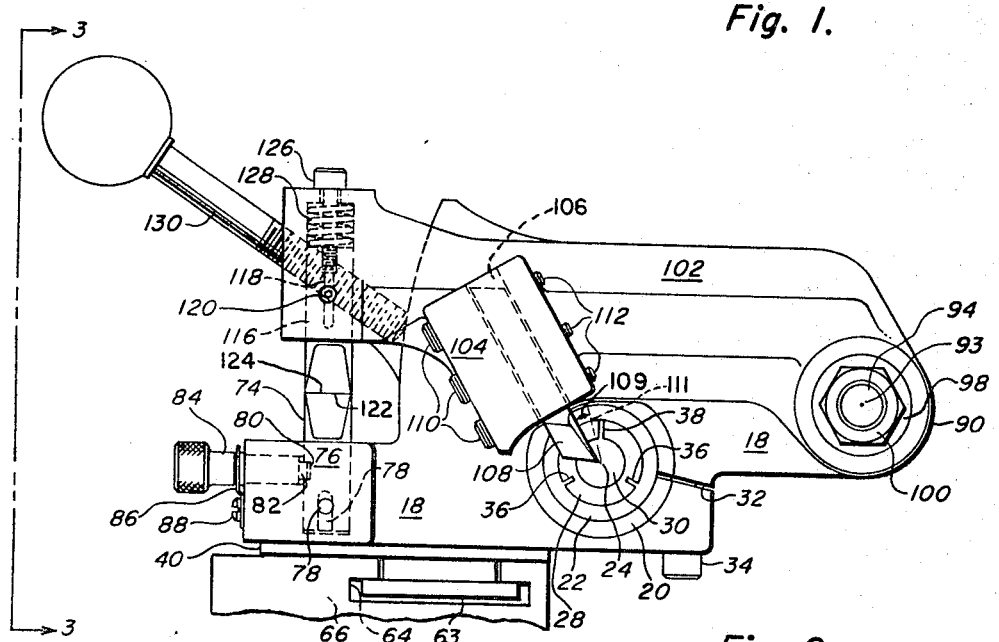
FIG. 2 is a side view of the FIG. 1 embodiment taken on line 2—2 of FIG. 1.
Figure 4:
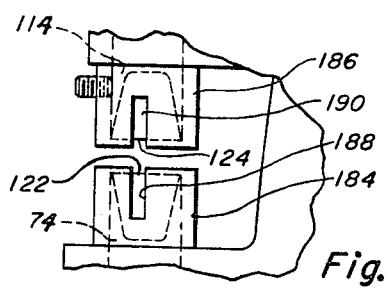
FIG. 4 is a view of a portion of the FIG. 3 illustration and carrying a modification suitable for use with flat templates.

The cutting tool 108 is then set with its point preferably exactly at the axis 24 when the template contour following surfaces 122 and 124 are together as shown in FIGS. 2 and 3. The adjusting screw 126 may be used for the final fine adjustment of the end of the cutting tool 108 to the axis 24. During this initial adjustment the reference follower 74 is lowered by means of the eccentric 82 to its bottom position as explained above and rod 130 is unscrewed sufficiently to prevent its threaded end from engaging the arcuate portion of the base 18.

A sample product such as a handle configuration 16 (FIG. 7) which is desired to be duplicated is provided with a mounting rod or end extension 17 which is inserted at one end into the Jacobs chuck 148 and the screw 160 and nut 168 used to achieve the proper height and alignment of the template 16 with the template contour follower surfaces 122 and 124 so as to have the axis of the template 16 in a plane parallel to the axis 24 and perpendicular to the contour follower surfaces 122 and 124.

The work-piece 30 may then be rotated by means of the headstock 72 in conventional manner about axis 24 and the cutting tool 108 fed to the end of the work-piece 30 which is now supported by the support bushing 28. The tailstosk spindle 174 may then be drawn forward or backward until the contour follower surfaces 122 and 124 are at the desired starting point on the template 16 when the cutting tool 108 is at the corresponding starting point on the work-piece 30. The lathe carriage 196 may then be fed toward the headstock 72 to effect the cut by the cutting tool 108 to reproduce on the work-piece 30 the duplicate of the sample product 16. During this cutting operation the template 16 as it passes over the reference template follower surface 122 will be caused to move upward and downward in a vertical plane. Such movement is facilitated by the flexibility in this vertical plane of the flat spring 154 (FIGS. 5 and 7) and has negligible effect on the dimension of the finished duplicate product 174. Similarly, a slight bend or sag in the template 16 has negligible effect on the dimension of the finished product.

Such duplication may be performed in a single pass over the work-piece 30 when the changes in shape are gradual and relatively small as appears in the product 16. If, however, the depth of cut is too great for one pass, then the eccentric 82 is preferably used to adjust the reference follower surface 122 upward to the roughing cut position explained above and the rod 130 is screwed into the lug 131 until the threaded end engages the arcuate portion of the base 18 so as to fasten the cutting tool 108 to a position for a desired depth of a first cut. The carriage 196 is then fed toward the headstock 72 to effect the first cut at the depth thus fixed with the rod 130. This first cut is preferably carried along the work-piece 30 a shorter distance than the support width of the bushing 28 so as to avoid losing the support of the bushing 28. A second cut may then be taken over this same partial length of work-piece at a depth again set by manual adjustment and clamping with the control rod 130 against the arcuate portion of the base 18. Additional cuts may be taken over this same partial length as desired until the roughed out diameter is reached. Thereupon the rod 130 is released from the arcuate portion of the base 18 and the finish cut for the partial length is then made by using the eccentric 82 to lower the contour follower surface 122 to the finish cut position. In general a .005" depth of cut by the eccentric 82 for the finish cut has been found suitable although other finish cut depths may also be used and provided for by the eccentric 82.

In the event of abrupt changes in dimension of the desired product, manual assistance by means of the knob 132 and control rod 130 for raising and lowering the lever 102 at appropriate points may be found desirable. Also, having finished the partial length with a finish cut as described above, a subsequent partial length may then be undertaken by repeating the cutting procedure used for the first described partial length. This cutting procedure is then repeated until the entire length of the duplicate product has received the finish cut, at which point the duplicate product is completed.

While provision has been made by eccentric 82 for a finish cut of uniform depth, it should be understood that in some instances such finish cut is not needed and a satisfactory duplicate may be made by one or more roughing cuts only by manually guiding the cutting tool 108 with the knob 132 and control rod 130.

It will be noted that when the distance between the tip of the cutting tool 108 and the pivotal axis 93 is one half the distance between the pivotal axis 93 and the axis of the sample product 16, the duplicate product 174 produced from the work-piece 30 will have the same dimensions as the sample 16. Other size ratios may be achieved by varying these distances to effect corresponding diametral changes or proportions of the product 174 with respect to the sample 16.

The present invention is als unable with conventional flat templates such as flat template 176 shown in FIG. 6. In such instance an adapter 178 is used on the rod 150 in place of the Jacobs chuck 148 and the end of the flat template 176 is fastened through holes 180 by screws 182 to the adapter 178. To insure a central location of the flat template 176 over the contour follower surfaces 122 and 124, guide sleeves 184 and 186 are provided over the cylindrical body portions 76 and 116 respectively. The sleeves 184 and 186 have guide slots 188 and 190 respectively for retaining and guiding the flat template 176 whose bottom surface 192 rides on template reference follower surface 122 in slot 188 and its top surface 194 is ridden on by template follower surface 124 in slot 190. Since the bottom surface 192 is straight, the perpendicular distance from surface 192 to the contour 194 must be twice the correspond diametral dimension desired on the finished product being formed from the flat template 176, in the embodiment shown.

This invention is not limited to the particular details of construction and operation described as equivalents will suggest themselves to those skilled in the art.

What is claimed is:

1. In a product duplicating device for a lathe having a carriage and cross slide thereon, the combination of a base adapted for attachment to the cross slide and having work support means, pivot means on one side of said work support means and reference template follower means on the other side of said work support means; a lever mounted to pivot at said pivot means; a cutting tool holder on said lever with capacity for holding said cutting tool in work cutting relation to said work support means; and template follower means on said lever in cooperative relation to said reference template follower means.

2. The combination as in claim 1 having resilient pressure means for yieldable urging said lever about said pivot means toward said base.

3. The combination as in claim 1 wherein said work support means has a work support axis, the pivot means has a pivotal axis, said template and reference template follower means have opposed contour follower surfaces, and the distance between said work support axis and pivotal axis is equal to substantially one half the distance between said pivotal axis and said contour follower surfaces.

4. The combination as in claim 3 wherein said tool holder is disposed angularly on said lever to carry said tool at an angle such that most of the cutting forces on said cutting tool pass through said pivotal axis.

5. The combination as in claim 3 wherein said tool holder is with capacity for holding said cutting tool with its cutting extermity at said work axis when said contour follower surfaces are in engagement with each other.

6. The combination as in claim 1 wherein said lever includes adjustable means cooperating with said base for fixing the depth of cut of said work by said cutting tool.

7. The combination as in claim 1 wherein said template follower means has a contour follower surface depending downwardly from said lever and includes means for adjusting the position of said surface in perpendicular relation to said lever.

8. The combination as in claim 1 wherein said reference template follower means has a contour follower surface facing upwardly with respect to said base and includes adjusting means for adjusting said surface between a roughing and finish cut positions.

9. The combination as in claim 3 wherein said contour follower surface of said template follower means faces downwardly and said contour follower surface of said reference template means faces upwardly when said duplicating device is in operating position on a lathe.

10. The combination as in claim 1 wherein said work support means includes a sleeve fixed to said base and having a tapered hole, and an adjustable bushing in said tapered hole for providing support to said work.

11. The combination as in claim 1 wherein the lathe is of the type having a tailstock and said duplicating device has means adapted for attachment to said tailstock for carrying a template in operative relation to said reference template follower means and said template follower means.

12. In a duplicating device for a lathe of the type having a tailstock carrying a tailstock spindle having an axis running longitudinally of the lathe, the combination of a clamp adapted for attaching to said spindle, a bracket adapted for fixing to said clamp and having means yieldable in a vertical plane substantially parallel to said spindle axis and rigid in a horizontal plane substantially parallel to said spindle axis for holding said template extended in a direction longitudinally of said lathe.

References Cited

UNITED STATES PATENTS

| 2,239,413 | 4/1941 | Dewey | 82—14 |
| 2,316,405 | 4/1943 | Clausen | 82—14 |

GERALD A. DOST, *Primary Examiner.*

U.S. Cl. X.R.

90—62